United States Patent
Keidel et al.

(10) Patent No.: US 12,217,516 B2
(45) Date of Patent: Feb. 4, 2025

(54) METHOD AND DEVICE FOR MULTI-SENSOR DATA FUSION FOR AUTOMATED AND AUTONOMOUS VEHICLES

(71) Applicant: Bayerische Motoren Werke Aktiengesellschaft, Munich (DE)

(72) Inventors: Frank Keidel, Poing (DE); Sebastian Rauch, Eisenhofen (DE); Sean Brown, Munich (DE); Tim Rakowski, Hebertshausen (DE); Alexander Born, Munich (DE); Fernando Herrero Carron, Munich (DE); Joachim Schiehlen, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 516 days.

(21) Appl. No.: 17/420,694

(22) PCT Filed: Oct. 21, 2019

(86) PCT No.: PCT/EP2019/078606
§ 371 (c)(1),
(2) Date: Jul. 5, 2021

(87) PCT Pub. No.: WO2020/160796
PCT Pub. Date: Aug. 13, 2020

(65) Prior Publication Data
US 2022/0101637 A1    Mar. 31, 2022

(30) Foreign Application Priority Data

Feb. 6, 2019 (DE) .................... 10 2019 102 922.8

(51) Int. Cl.
*G06V 20/56* (2022.01)
*B60W 60/00* (2020.01)
(Continued)

(52) U.S. Cl.
CPC ......... *G06V 20/588* (2022.01); *B60W 60/001* (2020.02); *G06F 18/25* (2023.01); *G06V 20/58* (2022.01)

(58) Field of Classification Search
CPC ...... G06V 20/58; G06V 20/588; G06V 20/50; G06V 20/54; G06V 20/56; G06F 18/25;
(Continued)

(56) References Cited

U.S. PATENT DOCUMENTS

2008/0183419 A1\* 7/2008 Cong ................. B60K 31/0066
702/155
2010/0082248 A1\* 4/2010 Dorum .................... G06F 16/29
701/533

(Continued)

FOREIGN PATENT DOCUMENTS

CN    102649430 A    8/2012
DE    102010020984 A1    10/2011
(Continued)

OTHER PUBLICATIONS

Manolis Tsogas et al. "Using digital maps to enhance lane keeping support systems" Intelligent Vehichles Symposium, 2007 IEEE, IEEE, PI, Jun. 1, 2007 (Jun. 1, 2007) pp. 148-153.
(Continued)

*Primary Examiner* — Edward F Urban
*Assistant Examiner* — Duy Tran
(74) *Attorney, Agent, or Firm* — Maginot, Moore & Beck LLP

(57) ABSTRACT

A computer-implemented method estimates a course of a roadway in a surrounding area of a vehicle on the basis of a state function describing the course of a roadway. The state function includes a clothoid spline. The method includes providing surrounding-area measurement data describing the course of a roadway at a current position of the vehicle,
(Continued)

the surrounding-area measurement data having at least one polynomial function. The method also includes transforming the state function and the surrounding-area measurement data into a common coordinate system. The method further includes adapting the state function on the basis of the surrounding-area measurement data in the common coordinate system.

19 Claims, 5 Drawing Sheets

(51) Int. Cl.
  *G06F 18/25* (2023.01)
  *G06K 9/62* (2022.01)
  *G06V 20/58* (2022.01)

(58) Field of Classification Search
  CPC .......... B60W 60/001; B60W 60/0011; B60W 60/0025; B60W 60/00259; B60W 2420/42; B60W 2552/00; B60W 2552/05; B60W 2552/10; B60W 2555/60; B60W 2556/00; B60W 2556/45
  See application file for complete search history.

(56) References Cited

U.S. PATENT DOCUMENTS

| | | | | |
|---|---|---|---|---|
| 2013/0173232 | A1* | 7/2013 | Meis | ...................... G08G 1/167 |
| | | | | 703/2 |
| 2015/0149076 | A1* | 5/2015 | Strauss | .................. G01C 21/34 |
| | | | | 701/410 |
| 2016/0304120 | A1 | 10/2016 | Masaya et al. | |
| 2017/0270373 | A1* | 9/2017 | Kawasaki | ................. G06T 7/60 |

FOREIGN PATENT DOCUMENTS

| | | |
|---|---|---|
| DE | 102013002889 A1 | 8/2014 |
| DE | 102014200638 A1 | 7/2015 |
| DE | 102015013085 A1 | 3/2016 |
| DE | 112016000423 T5 | 10/2017 |
| DE | 102016211730 A1 | 1/2018 |
| DE | 102017209346 A1 | 1/2019 |
| EP | 2525303 A1 | 12/2012 |
| WO | 2004031691 A1 | 4/2004 |
| WO | 2018019454 A1 | 1/2018 |

OTHER PUBLICATIONS

Felix Foborg. "Road Shape Estimation based on On-board Sensors and Map Data" Jan. 1, 2014 (Jan. 1, 2014).
International Search Report corresponding to International Patent Application No. PCT/EP2019/078606, dated Jan. 17, 2020 (6 pages).
German Search Report corresponding to German Patent Application No. 10 2019 102 922.8, dated Sep. 26, 2019 (9 pages).
Chinese Office Action corresponding to Chinese Patent Application No. 2023122903044560, dated Dec. 29, 2023 (13 pages).
English Translation of Chinese Office Action corresponding to Chinese Patent Application No. 2023122903044560, dated Dec. 29, 2023 (10 pages).

* cited by examiner

METHOD AND DEVICE FOR MULTI-SENSOR DATA FUSION FOR AUTOMATED AND AUTONOMOUS VEHICLES

The present application is the U.S. national phase of PCT Application PCT/EP2019/078606 filed on Oct. 21, 2019, which claims priority of German patent application No. 102019102922.8 filed on Feb. 6, 2019, which is incorporated herein by reference in its entirety.

BACKGROUND

Exemplary embodiments of the present invention relate to a computer-implemented method, a vehicle, a computer program and a device for estimating a course of a roadway. The course of a roadway is described here by a state function, which comprises a clothoid spline.

When controlling some automated or autonomously driving vehicles, methods for estimating the course of a roadway are used, on the basis of which the control of such a vehicle makes driving decisions.

In this case, the course of a roadway may be described in approximation by determining a roadway model corresponding to the state function. As a result, the course of a roadway may be ascertained in particular in relation to a position and/or an orientation of the vehicle. Properties of the course of a roadway may be for example the width, direction, curvature or number of adjacent lanes or the position of the vehicle with respect to the lanes (for example the vehicle is in the right, middle or left of three lanes).

The vehicle can then be controlled such that for example it follows the course of a roadway, avoids obstacles or can change lane. For highly available, safe and comfortable operation of the vehicle, when ascertaining the course of a roadway or roadway model, surrounding-area measurement data of multiple data sources may be combined (fused). Combining data sources, also referred to as data fusion, means in this case combining data of multiple data sources. Typical data sources may be for example sensory data sources, such as a camera or waypoints of a digital map. Such a digital map may be in particular a low-resolution (SD) map or a high-resolution (HD) map. There are various possibilities for such data fusion.

The document WO2018/019454 describes a method for ascertaining a roadway model. Here, a plurality of hypotheses for a roadway model are generated by means of different parameterizations of map data and observation data. On the basis of confidence values of the hypotheses, a hypothesis for a roadway model is selected. A method for data fusion of the observation data and camera data that ensures a highly available determination of the course of a roadway is not considered in this.

Further conventional controls typically use exclusively data of an individual data source (camera, digital map) to create a roadway model. This cannot ensure highly available determination of the course of a roadway, since, if the data source were to become inoperable, it would mean that determination of the course of a roadway is no longer possible. Furthermore, individual data sources may generate noisy or partly error-affected surrounding-area measurement data, as a result of which an estimation of the course of a roadway may be inaccurate.

There is therefore a need to provide a computer-implemented method for estimating the course of a roadway that ensures the highly available and precise determination of the course of a roadway. This need is met by the computer-implemented method, the device, the computer program and the vehicle according to the independent claims.

SUMMARY

Exemplary embodiments of the present invention provide a computer-implemented method, a vehicle, a computer program and a device that serve for estimating a course of a roadway in a surrounding area of the vehicle. By means of data fusion of surrounding-area measurement data of multiple data sources with a state function describing the course of a roadway (roadway model), high availability and high precision of the estimation can be ensured. The surrounding-area measurement data of the respective data sources are in this case output variables of measurements of the course of a roadway and comprise at least one polynomial function. The state function comprises a clothoid spline. The data fusion of the surrounding-area data with the state function means in this case the adaptation of the state function, or of the clothoid spline, to the surrounding-area measurement data by a real-time filter. A Kalman filter has proven to be advantageous as a real-time filter for the estimation of the course of a roadway.

The adaptation of the state function with the Kalman filter usually requires the transformation of the state function from a state space into a measurement space. In exemplary embodiments of the present invention, this may be a transformation of the state function between different coordinate systems. In the measurement space, a state function produced by a prediction of the Kalman filter can be corrected with surrounding-area measurement data of multiple data sources or sensors. In connection with the Kalman filter, this is usually referred to as innovation. The state function updated by the adaptation or innovation corresponds to an approximate estimation of the course of a roadway. By adapting the state function repeatedly over time to surrounding-area measurement data, the estimation is continually updated, so that for example a course of a roadway of a road can be estimated with precision and certainty. An adaptation of the state function to surrounding-area measurement data of multiple data sources ensures high availability and high accuracy in the estimation of the course of a roadway.

A first aspect of the invention concerns a computer-implemented method for estimating a course of a roadway in a surrounding area of a vehicle on the basis of a state function describing the course of a roadway. The state function in this case comprises a clothoid spline. The computer-implemented method also comprises provision of surrounding-area measurement data that describe the course of a roadway in a specific surrounding area of the current position of the vehicle. The surrounding-area measurement data in this case comprise at least one polynomial function. The polynomial function may for example be generated on the basis of a polyline with the aid of a curve regression method. Such a polyline refers here to a series of contiguous line segments. The computer-implemented method comprises furthermore a transformation of the state function and the surrounding-area measurement data into a common coordinate system and an adaptation of the state function on the basis of the surrounding-area measurement data in the common coordinate system.

For example, the computer-implemented method is based on a recursive method, such as for example the Kalman filter, which may have successive recursion steps. Each recursion step in this case serves for estimating the course of a roadway that is described by the state function. Since clothoids are often used in traffic route construction when calculating the course of a roadway, the course of a roadway can in turn be precisely estimated or reconstructed in approximation by successive clothoid segments. Therefore, it may be advantageous when estimating the course of a roadway to assume the clothoid spline for the state function. The clothoid spline may in this case have been determined completely by parameters such as curvature, change of curvature, angle and y-intercept.

Input variables for estimating the course of a roadway are the surrounding-area measurement data. The surrounding-area measurement data may take the form of polynomial functions or polynomial splines, which can be obtained from measurement data of vehicle-external and vehicle-internal sensors. The surrounding-area measurement data for example replicate in approximation the observed course of a roadway in the surrounding area of the vehicle.

The surrounding-area measurement data can then be compared with the state function. For this purpose, it is advantageous that the state function and the surrounding-area measurement data are in a common measurement space. A transformation of the state function into another coordinate system is often suitable for this. For example, the clothoid spline may be represented in a coordinate system with curvature values and arc lengths, whereas the surrounding-area measurement data may be in a coordinate system with location coordinates. For this reason, for example a measurement model is applied to the state function in order to represent the state function at least in approximation in the coordinate system with location coordinates. The clothoid spline, which is typically represented as a function of an arc length, may for example be represented in approximation by one or more third-degree polynomials or in a parameter representation in location coordinates. Then, the state function recorded in the prediction can be updated with the surrounding-area measurement data in the Kalman filter.

The updated state function is usually obtained as the output variable of a recursion step. For a highly available and precise computer-implemented method for determining the course of a roadway, it may in this case be advantageous for the data fusion of the recursion step to use surrounding-area data of multiple data sources or sensors, possibly of different types. Such data fusion is referred to as multi-sensor data fusion.

In some exemplary embodiments, the surrounding-area measurement data may be recorded by at least one camera. For example, a camera may be used as one or more sensors or multiple cameras may be used for multi-sensor data fusion. Photos of a roadway taken by the at least one camera may in this case be used to detect the course of a roadway by means of a suitable image processing application. From the photos, for example, a course of roadway markings or roadway boundaries can be ascertained and represented in approximation by at least one polynomial function. The at least one polynomial function corresponds to the surrounding-area measurement data. For a more accurate estimation, the course of a roadway may also be approximated by a plurality of contiguous polynomial functions. Recording the course of a roadway with the aid of a plurality of cameras may likewise contribute to a more accurate estimation of the course of a roadway.

In addition or as an alternative, surrounding-area measurement data may be provided by a map. The map takes the form for example of a digital map with a specific spatial resolution. High-resolution maps (HD maps) for example have a spatial resolution of 10 to 25 cm, which means that structures or objects of a size that corresponds at least in one dimension to the respective spatial resolution can be represented with an accuracy of the spatial resolution. For example, the roadway, roadway boundaries or roadway markings can thus be detected. Waypoints that identify the course of a roadway may be taken from the map. By means of interpolation of the waypoints, it is possible to ascertain a polynomial or, as usual, a polynomial spline of multiple polynomials, which determine in approximation the course of a roadway on the basis of the waypoints. The polynomial or the polynomial spline is referred to as map data.

In some embodiments of the present invention, first surrounding-area measurement data may be recorded by at least one camera and second surrounding-area measurement data may be provided by a map. On the basis of the surrounding-area measurement data recorded by the camera or ascertained from the map, it is possible in each case to ascertain a polynomial or a polynomial spline which respectively describes in approximation the course of a roadway in the surrounding area of the vehicle. The state function may in this case be adapted to the first surrounding-area measurement data and in addition to the second surrounding-area measurement data. By adapting the state function to surrounding-area measurement data of multiple sensors or data sources of different types (camera and map), a high availability and increased precision of the determination of the course of a roadway can be obtained. High availability means in this case that, even in the event of failure of one data source, the course of a roadway can continue to be reliably estimated, so that in this case the vehicle can for example still be controlled into a safe parking position or into a workshop.

In further exemplary embodiments, the computer-implemented method may comprise the transformation of the state function and the surrounding-area data into a common coordinate system with spatial coordinates. The innovation of the Kalman filter typically requires a transformation of the state function into the measurement space, in order to update the state function with the surrounding-area measurement data. Typically, the surrounding-area measurement data of the camera are already in a coordinate system with spatial coordinates. Consequently, the transformation of the state function means a conversion with the aid of a measurement model, so that the state function can be represented in the measurement space, the coordinate system with spatial coordinates. In this case, the clothoid spline is described for example by one or more third-degree polynomials or in the parameter representation by Fresnel integrals. For reducing the numerical complexity in the data fusion, the Fresnel integrals may in each case be approximated by a Taylor series. What is advantageous about the data fusion in the coordinate system with spatial coordinates is that an orientation and absolute position of the vehicle on the roadway can be determined. For example, it can thus be determined in which lane of a multilane roadway the vehicle is located and/or whether it is moving along the roadway or transversely to the roadway.

Further exemplary embodiments of the present invention also comprise a sampling method for determining sample points for the adaptation of the state function. It may be advantageous if there is a constant curve length between neighboring sample points in each case when there are multiple sample points. The sample points may for example be ascertained by a suitable mathematical method. The constant curve length may serve as an input variable for the mathematical method and for example be prescribed or ascertained depending on a property of the course of a roadway, such as for example a roadway curvature.

For the adaptation by the Kalman filter, it may be advantageous if the state function and/or the surrounding-area measurement data are in a point space of the measurement space. This means that for example, with respect to an advantage for the adaptation, both the state function and the surrounding-area measurement data are in each case represented by a plurality of sample points. On the basis of the sample points, the Kalman filter can adapt the state function to the surrounding-area measurement data. Typically, the sample points are in a coordinate system with location coordinates.

Optionally, the sample points may be determined exclusively for the state function. The sample points are then for example interpolated by a polynomial of the same degree as the polynomial of the surrounding-area measurement data. The Kalman filter may then be designed such that in each recursion step polynomial parameters of the transformed state function are approximated to further polynomial parameters of the surrounding-area measurement data. By way of a measurement model, parameters of the state function can be ascertained from the polynomial parameters, so that the state function with the parameters corresponds in approximation to the surrounding-area measurement data.

In the case of a plurality of sample points of the state function and of the surrounding-area measurement data, the sample points can be chosen dependent on a sampling method such that it is advantageous for the adaptation of the state function to the surrounding-area measurement data. In this case, sample points to be compared are chosen such that they lie with an equal arc length of the state function or of the surrounding-area measurement data. Furthermore, with a plurality of sample points in each case, they may be chosen such that between neighboring sample points of a curve (state function, surrounding-area measurement data), there is in each case a constant arc length of the curve. Consequently, a state function that has strong curvatures can be precisely adapted to the surrounding-area measurement data of the camera. Thus, in some exemplary embodiments, the reliable estimation of a possibly strongly curved course of a roadway can be ensured.

In further exemplary embodiments, the computer-implemented method may comprise a transformation of the state function and of the surrounding-area data into a common coordinate system with curvature values. The measurement space here comprises a two-dimensional coordinate system, which are determined by curvature values and arc lengths. Usually, the clothoid spline is in this measurement space. The map data, typically as a polynomial spline, are in a coordinate system with location coordinates, which can be obtained by an interpolation of the waypoints. The polynomial spline can be transformed such that the curvature values of the polynomial spline can be ascertained dependent on the arc length of the polynomial spline. Consequently, the state function and the polynomial spline can be represented in the measurement space, which comprises the coordinate system with the curvature values and the arc lengths. The curvature values of the state function are often thus comparable with the curvature values of the polynomial spline for the Kalman filter.

In some embodiments of the present invention, the adaptation of the state function to the surrounding-area measurement data may provide an adaptation of at least one curvature value of the state function to at least one further curvature value of the surrounding-area measurement data. In the innovation of the Kalman filter, for example, the curvature values of the state function and of the polynomial spline may be used as input variables. The data fusion of the map data with the Kalman filter means in this case the adaptation of the curvature values of a point or of multiple points of the state function to the curvature values of a transform of the map data.

The computer-implemented method described here may in this case be designed in particular to determine the course of a roadway of normal roads or roadways. Normally, the roadways, especially on freeways, freeway-like roads and in an urban area, are provided with roadway markings, in order to make the course of a roadway identifiable, for example for a vehicle driver. The roadway markings may for example be used for the estimation of the course of a roadway.

According to further exemplary embodiments, the state function may identify a course of the roadway marking of the roadway. For this purpose, photos of the roadway markings may be taken by the at least one camera. Recording the course of a roadway by means of the at least one camera usually takes place by way of an image processing application, which can ascertain a course of roadway markings or roadway boundaries from photos of the at least one camera. Consequently, surrounding-area measurement data of the at least one camera can identify the course of the roadway markings or the roadway boundaries. This estimation may be advantageous in the control of the vehicle, in order for example to ascertain a roadway width or a distance of the vehicle from the roadway boundary.

In further exemplary embodiments, an ascertainment of a course of a lane center by transforming the state function may be advantageous. In some cases, the course of the lane center is required for the control of the vehicle. Surrounding-area measurement data of the at least one camera for example describe the course of roadway boundaries or roadway markings that are located at the sides of the roadway. In the data fusion of these surrounding-area measurement data, the course of the roadway markings or roadway boundaries can therefore be estimated. With a known roadway width, the state function that describes the course of the lane center can be ascertained on the basis of this estimate. By translation and alteration of curvature values, the state function that describes the course of the lane center can be inferred from the course of the roadway markings and the roadway boundaries.

Optionally, the computer-implemented method may in further exemplary embodiments also comprise provision of validation measurement data and a validation of the estimation of the course of a roadway with the aid of the validation data. Further sensors, such as for example lidar, radar and/or ultrasound sensors, may provide the validation measurement data, which identify a position and/or a course of boundary structures of the roadway for example on the basis of location coordinates. Boundary structures may be for example guardrails, noise barriers or delineators. The validation measurement data consequently identify areas that can be driven along by the vehicle. When validating the estimation of the course of a roadway, it may be ascertained whether the state function lies within the area that can be driven along, and consequently a statement can be made as to whether the estimated course of a roadway may be realistic. The validation increases the robustness of the computer-implemented method with respect to errors in the estimation of the course of a roadway. For example, an erroneous estimation, that is to say a state function that does not lie within the area that can be driven along, can remain unconsidered in the control of the vehicle.

A second aspect of the present invention concerns a device for estimating the course of a roadway in the surrounding area of the vehicle. The device comprises one or more interfaces to record surrounding-area measurement data. Furthermore, the device comprises a processing unit, which is designed to perform the computer-implemented method for estimating the course of a roadway in the surrounding area of the vehicle.

The surrounding-area measurement data may in this case be for example map data or surrounding-area measurement data of the camera. An interface of the device is accordingly for example a connection to a storage medium on which the map data are stored and from which they can be retrieved or transmitted. Further interfaces could be connections to one or more cameras that provide the surrounding-area measurement data.

The processing unit may be for example a computer, a microcontroller, a processor or a programmable hardware component that is configured to perform the computer-implemented method. The surrounding-area measurement data recorded by the interfaces are in this case transmitted from the interfaces to the processing unit, so that the surrounding-area measurement data serve as an input variable for the estimation of the course of a roadway.

A third aspect concerns a vehicle with the device for estimating the course of a roadway in the surrounding area of the vehicle. The vehicle may be any land vehicle, in particular a passenger car, truck, motorcycle or agricultural machine.

BRIEF DESCRIPTION OF THE DRAWINGS

Exemplary embodiments are explained in more detail below with reference to the accompanying figures, in which.

DETAILED DESCRIPTION

Various exemplary embodiments are now be described in more detail with reference to the accompanying drawings, in which some exemplary embodiments are represented. In the figures, the thickness dimensions of lines, layers and/or regions may be represented in an exaggerated manner for the sake of clarity.

In the area of concepts for autonomous driving, it may be of great importance for the control of for example autonomously driving vehicles to estimate the surrounding area and the course of a roadway. Thus, for example, the vehicle may be activated in such a way that it controls the steering, acceleration, speed and further vehicle or driving parameters autonomously, without the driver doing anything, so that the vehicle for example safely follows the estimated course of a roadway and/or can avoid obstacles.

Figure 1:
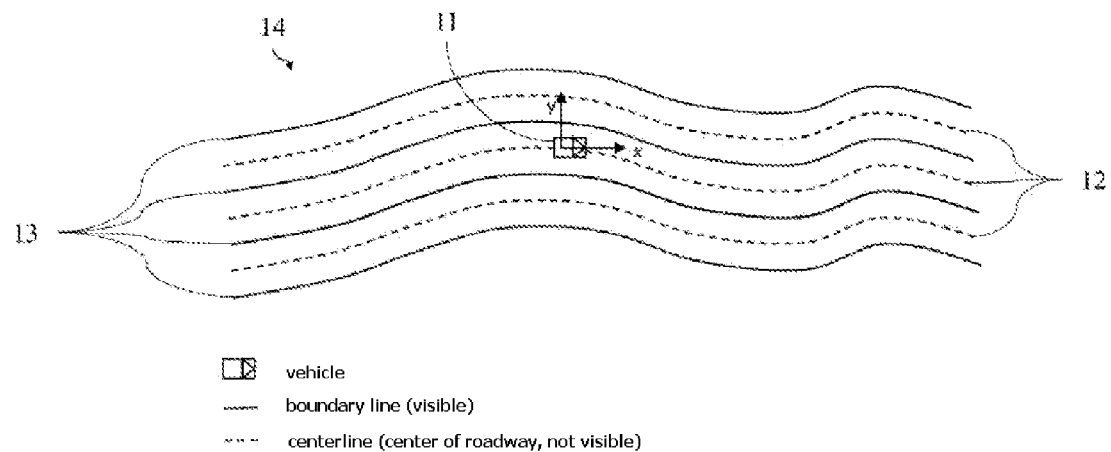
FIG. 1 shows a schematic representation of a multilane road with a vehicle located on it.

Shown in FIG. 1 by way of example is a schematic course of a roadway of the roadway 14, on which the vehicle 11 is located and/or is moving. Exemplary embodiments of the invention described here may be designed to estimate the course of a roadway in two translational directions, that is to say in two dimensions. FIG. 1 shows the roadway from a plan view in the two dimensions. The vehicle 11 is in this case in a middle lane of three lanes of the roadway 14, which may for example be driven along in one or both directions. In advantageous exemplary embodiments of the invention described here, for example a course of the roadway 14 or of the lane may be estimated. In a further sense, in the present disclosure the course of a roadway may be taken as meaning both the course of the roadway and the course of the lane.

A lane center of the lane and/or a course of the lane center may be identified by a centerline 12. Usually, however, roads do not have a centerline 12, so that the lane center is not "visible". The individual lanes are typically bounded in each case by roadway markings, such as a boundary line 13.

Customary methods from the prior art determine for example the course of a roadway on the basis of a roadway model based on polynomials or polynomial splines that can be obtained for example directly from photos of the camera or from the digital map. However, in construction planning, the roadway 14 is typically designed on the basis of driving comfort and for safety reasons on the basis of a spline (clothoid spline) of contiguous clothoid segments. An advantage of such a construction of the roadway 14 is a linear alteration of a roadway curvature, so that curves can be traveled through with a high degree of driving comfort and, for the driver of vehicles that are not autonomously driven, can be estimated well. On account of a manner of construction based on the clothoid spline, it may prove to be advantageous to assume a roadway model based on a clothoid spline in the estimation of the course of a roadway. For example, in this way the accuracy and reliability of the estimation can be increased.

Figure 2:
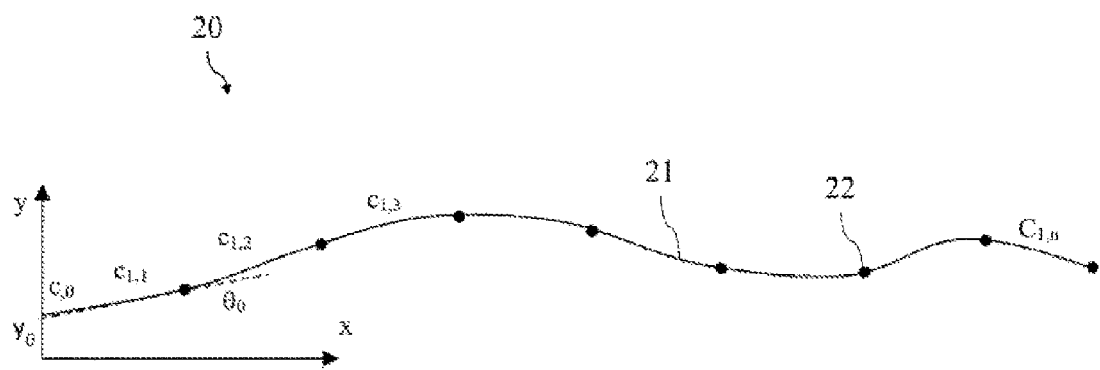
FIG. 2 shows an example of a clothoid spline with n clothoid segments.

The roadway model of the roadway 14 that is based on a clothoid spline 20 is shown by way of example in FIG. 2. The clothoid spline 20 comprises the clothoid segments 21 and the transition points 22 between two clothoid segments 21. The clothoid segments 21 correspond to parts of clothoid functions.

The clothoid functions, or curvature values c(s) of the clothoid functions, can be replicated dependent on the arc length s according to:

$$c(s) = c_0 + c_{1,m} \cdot s \quad (1)$$

where $c_0$ stands for an initial curvature and $c_{1,m}$ stands for a constant change of curvature of the mth clothoid segment 41 with the arc length s. It can be seen from (1) that the curvature value c(s) of the clothoid function changes linearly with $c_{1,m}$.

In the case of the clothoid spline 20 represented in FIG. 2, an orientation $\theta_0$ and a y-intercept $y_0$ of a clothoid segment 21 may be additionally indicated. Generally, therefore, each of the clothoid segments 21 of the clothoid spline 20 may be completely characterized by the parameters $c_0$, $c_1$, $\theta_0$ and $y_0$. For the clothoid spline 20 with n (n∈ℕ)

clothoid segments 21, this would mean that the clothoid spline 20 can be described by 4·n parameters. The clothoid spline 20 shown in FIG. 2 satisfies connection conditions between the clothoid segments 21 that can reduce the number of the parameters necessary for describing the clothoid spline 20, so as to reduce computational effort for determining the clothoid spline 20. The clothoid spline 20 is for example continuous at the transition points 22, differentiable and the curvature values of two successive clothoid segments 21 are equivalent at the transition points 22. Under the stated connection conditions, the number of parameters necessary for describing the clothoid spline 20 can be reduced to n+3. Therefore, the clothoid spline 20 can be completely characterized by a reduced set of parameters ($c_0$, $\theta_0$, $y_0$ and $c_{1,1} \ldots c_{1,n}$).

The clothoid spline 20 can replicate in good approximation the course of a roadway of the roadway 14, for example both in front of and behind the vehicle 11. For a determination of the clothoid spline 20, surrounding-area measurement data of multiple data sources or sensors, possibly of different types, are used. In particular when using sensors of different types, there may be a need to determine the clothoid spline 20 in such a way that the surrounding-area measurement data of the sensors of different types are included in the determination of the clothoid spline 20. This need can be met for example by exemplary embodiments of the computer-implemented method 30 represented in FIG. 3 for estimating the course of a roadway.

The computer-implemented method 30 for estimating the course of a roadway in the surrounding area of the vehicle is based on a determination of the state function describing the course of a roadway. The state function in this case comprises the clothoid spline 20.

The computer-implemented method 30 comprises the provision 31 of surrounding-area measurement data that describe the course of a roadway at a current position of the vehicle 11. The surrounding-area measurement data in this case comprise at least one polynomial function. The computer-implemented method 30 also comprises the transformation 32 of the state function and the surrounding-area measurement data into the common coordinate system and the adaptation 33 of the state function based on the surrounding-area measurement data in the common coordinate system.

The surrounding-area measurement data of the vehicle's own sensor system, such as the camera or multiple cameras, may, as in a present exemplary embodiment, describe a course of the boundary lines 13 or the course of the lane center 12 of the lane on the basis of a polynomial function or a polynomial spline.

For estimating the course of a roadway, the HD map of a map producer may also be used. On the basis of waypoints of the roadway that can be taken from the HD map, surrounding-area measurement data can be ascertained. The waypoints may for example identify the lane center. The resultant map data usually describe the course of a roadway on the basis of a further polynomial spline.

Real-time filters, such as Kalman filters, it may be possible for example to update the state function, or the clothoid spline 20, with the surrounding-area measurement data, as long as the state function and the surrounding-area measurement data are in the common coordinate system. For example, as in the representation (1), the state function is in a state space that comprises curvature values. The surrounding-area measurement data are for example in a measurement space with location coordinates. The state function may be replicated by transformation 32 for example in the common coordinate system, which may comprise curvature values or location coordinates.

In the common coordinate system, for example the Kalman filter may use the surrounding-area measurement data to perform an adaptation 33 of the clothoid spline 20 to the surrounding-area measurement data.

The computer-implemented method 30 may for example describe an individual recursion step of the recursive method. The recursive method comprises for example multiple successive recursion steps, which serve for example for the estimation of the course of a roadway. The recursive method may for example be realized by the Kalman filter or by further real-time filters. In some exemplary embodiments, the Kalman filter has proven to be advantageous.

Input variables of the individual recursion steps are the state function from one of the previous recursion steps and the surrounding-area measurement data, which can be recorded by the provision 31 of the surrounding-area measurement data by means of the at least one camera and the HD map. A recording and the transformation 32 of the state function of a previous recursion step characterize a first phase of the Kalman filter. This phase is referred to as prediction.

In the prediction of the Kalman filter, an estimation may be ascertained for a current state of the clothoid spline 20. For this, the clothoid spline may be subjected to a state dynamic. The state dynamic is for example determined by a movement of the vehicle 11. If the vehicle 11 is moving along the roadway 14, the clothoid spline 20 may for example be extended in front of the vehicle 11 and shortened behind the vehicle 11. Since the clothoid spline 20 is usually made up of individual segments 21, the clothoid spline 20 may for example not be extended or shortened continuously with each recursion step, but only for the case where the vehicle 11 passes over one of the transition points 22.

The state function of the previous recursion step is updated by adaptation 33 to the surrounding-area measurement data in each recursion step. The adaptation corresponds to a second phase of the Kalman filter, referred to as innovation. For the adaptation 33, for example the state function is compared with the surrounding-area measurement data. For example, for this, individual values of the state function are compared with further values of the surrounding-area measurement data. These values may be, depending on the measurement space, for example location coordinates or curvature values of the state function and of the surrounding-area measurement data. Usually, the values of the state function have an unsharpness, or the values of the surrounding-area measurement data have a measuring uncertainty, which may be represented in each case by a probability distribution, such as for example a Gaussian distribution. In the second phase of the Kalman filter, the adaptation 33 of the state function can take place with the state function and the surrounding-area measurement data as input variables. A weighting of the input variables in the adaptation 33 of the state function may in this case be dependent on the measuring uncertainties, or the unsharpness. The lower the measuring uncertainty of the surrounding-area measurement data, the more for example the state function ascertained in the prediction can be approximated to the surrounding-area measurement data. The greater the measuring uncertainty of the surrounding-area measurement data, the lower the weighting of the surrounding-area measurement data in the adaptation 33 can be. The unsharpness of the state function provided as the input variable is based for example on average values and indications of variance (for example covariances) of the parameters of the clothoid spline 20. The average values and covariances may be ascertained from the parameters of previous recursion steps. The unsharpness of the state function may for example be determined by the covariances. With high covariance, the state function recorded in the prediction may be given low weighting. With low covariance, on the other hand, the state function is given a high weighting. Accordingly, depending on the unsharpness and measuring uncertainty, an updated state function or clothoid spline 20 is obtained from the surrounding-area measurement data and the state function serving as an input variable. In a then-following recursion step, the last-updated state function can in turn be used for the prediction.

Figure 3:
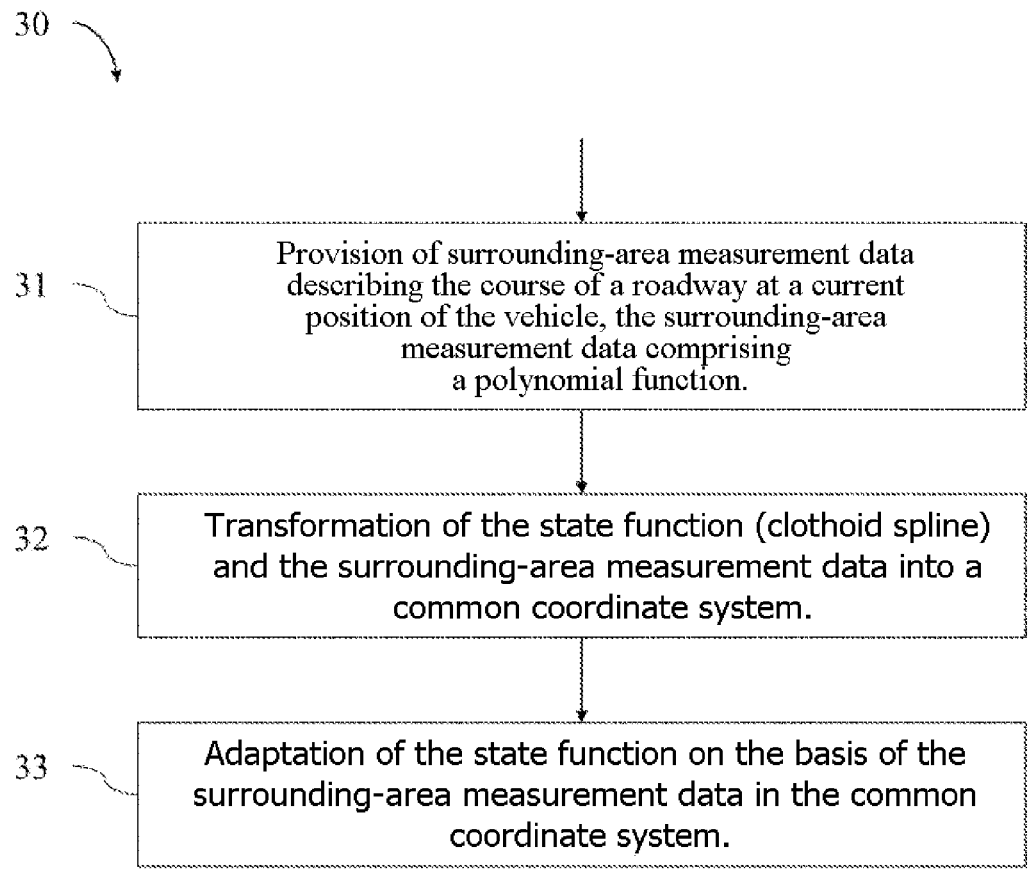
FIG. 3 shows a schematic flow diagram of the computer-implemented method for estimating the course of a roadway in the surrounding area of the vehicle.

The surrounding-area data of individual sensors (sensor system of the map producer and the vehicle's own sensor system) cannot determine the course of a roadway exactly. The surrounding-area measurement data of the sensor system may for example be partly noisy or erroneous. The data fusion of the surrounding-area data of multiple sensors (data sources) of different types can however ensure a robust, highly available and less error-affected estimation of the course of a roadway. This concept of multi-sensor data fusion is illustrated in FIG. 3.

In the multi-sensor data fusion, data, in particular surrounding-area measurement data, of a plurality of sensors can be fused to form the roadway model. In the exemplary embodiment represented in FIG. 4, the surrounding-area measurement data may be provided by means of the camera 41 and the HD map 43.

The camera 41 may for example be fastened on the vehicle and directed in the direction of travel. As already mentioned, the roadway markings, the roadway boundaries and their course may be represented in approximation in the form of one or more successive polynomial functions from photos of the camera 41 by means of an image processing application. Typically, a range or a measuring radius of the camera 41 is limited by obstacles or an optical range of the camera 41.

The HD map 43 is typically based on output variables of a sensor system of a map producer 42. By interpolation of the waypoints that can be taken from the HD map, one or more contiguous polynomial functions can be determined in order to describe in approximation the course of a roadway. The HD map 43 or corresponding map data may for example be on a storage medium that is attached to the vehicle 11. As an alternative or in addition, the HD map 43 or the map data could be transmitted from a transmitter to a receiving module of the vehicle 11 or a device for estimating the course of a roadway.

By adaptation 33 of the state function in the second phase of the Kalman filter, for example according to multi-sensor data fusion 40, the surrounding-area measurement data of the HD map 43 and of the camera 41 are included in the estimation of the course of a roadway or of the roadway model 45, which can be represented by the state function or the clothoid spline 20. Even if the exemplary embodiment described here envisages use of a single camera, further exemplary embodiments may comprise a plurality of cameras 41, which may possibly be aligned in different directions.

Figure 5:
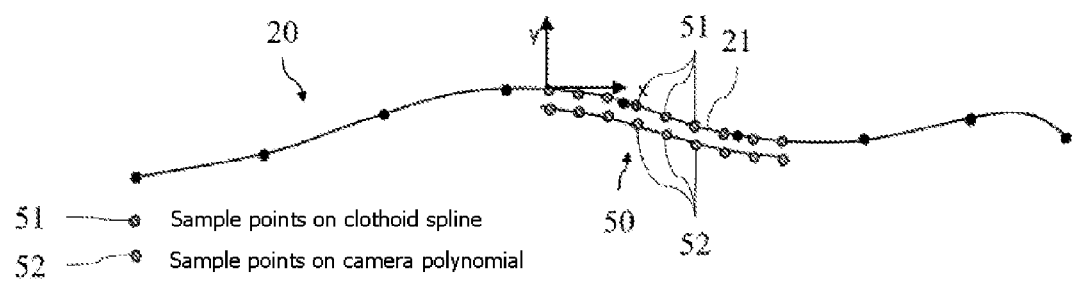
FIG. 5 shows a schematic representation of a sampling method of the clothoid spline and of the surrounding-area measurement data.

With the Kalman filter, the clothoid spline 20 may for example be adapted inter alia to surrounding-area data of the camera 41. With the aid of the curves 20 and 50 represented in FIG. 5, the data fusion 44 of the surrounding-area measurement data of the camera 41 is to be discussed in more detail below.

For the adaptation 33 of the state function 20 in the second phase of the Kalman filter, the state function 20, that is to say the clothoid spline 20, and the surrounding-area measurement data 50 are transformed into a point space. This means that both the surrounding-area measurement data 50 and the clothoid spline 20 can be respectively described by a plurality of points of the point space. The points may be ascertained by a sampling method from the clothoid spline 20 and the surrounding-area measurement data 50. Therefore, the points are also referred to as sample points 51 and 52.

On the basis of the usual representation (1) for the clothoid spline, it is not possible to ascertain sample points 51 or location coordinates of the sample points 51. Therefore, the transformation 32 of the clothoid spline is necessary. For the transformation 32 of the clothoid spline 20, a measurement model may be ascertained, with the aid of which the clothoid spline 20 can be transformed into the measurement space of the surrounding-area measurement data 50, so that the clothoid spline 20 can be represented by location coordinates.

In this case there are multiple measurement models for a transformation 32 of the clothoid spline 20, in order to represent it by location coordinates instead of, as in (1), by arc lengths and curvature values. Two measurement models that can be used for the transformation 32 of the clothoid spline 20 are to be discussed below by way of example on the basis of the replications 60-1 and 60-2 represented in FIG. 6.

A first measurement model for the transformation 32 of the clothoid spline 20 provides an approximate representation of the clothoid spline 20, in that the clothoid segments 21 are approximated by third-degree polynomials 62. This representation is shown in the replication 60-1. The third-degree polynomial 62 may in this case be represented as follows:

$$y(x) = ax^3 + bx^2 + cx + d \qquad (2)$$

a, b, c, and d correspond to parameters that determine a form of the polynomial 62. For the approximate representation of the clothoid segment 21, the parameters a, b, c, and d can be substituted by the parameters $c_0$, $c_{1,m}$, $\theta_0$ and $y_0$ of the clothoid segment 21 in the following way:

$$\begin{aligned} a &= c_{m,1}, \\ b &= c_0, \\ c &= \mathrm{atan}(\theta_0), \\ d &= y_0 \end{aligned} \qquad (3)$$

By using the parameters according to (3), for example the polynomial 62 is obtained, replicating in approximation a course of the clothoid or for example the clothoid segment 21. Correspondingly, the sample points 61 correspond in approximation to the sample points 51. The approximate representation of the clothoid segment 21 by (2) and (3) therefore allows each sample point 61 to be assigned location coordinates. By way of the first measurement model described here, the clothoid spline 20 in the Kalman filter can be represented in the point space. With the sample points 61 and the sample points 52 of the point space as input variables, the Kalman filter can perform an approximation of the polynomial 62 to the surrounding-area measurement data 50. Here, values for the parameters $c_0$, $\theta_0$, $y_0$ and $c_{1,1} \ldots c_{1,n}$ of the clothoid spline 20 can be ascertained. When using the values, the estimation of the course of a roadway can be determined, obtained by the adaptation 33 of the clothoid spline 20 to the surrounding-area measurement data 50 of the camera 41.

In the case of small curvatures, the clothoid segments 21 can be approximated well by the described measurement model according to (2) and (3). In the case of great curvatures, an accuracy of the approximate representation of the clothoid spline 20 according to (2) and (3) may be insufficient to ensure a high degree of accuracy for the adaptation 33 of the clothoid spline 20 to the surrounding-area measurement data 50.

For better approximation in the case of great curvatures, a second measurement model may be applied to the clothoid spline 20 instead of the first measurement model. For example, the clothoid segment 21 may be represented by the parameter representation of the clothoid function.

Figure 6:
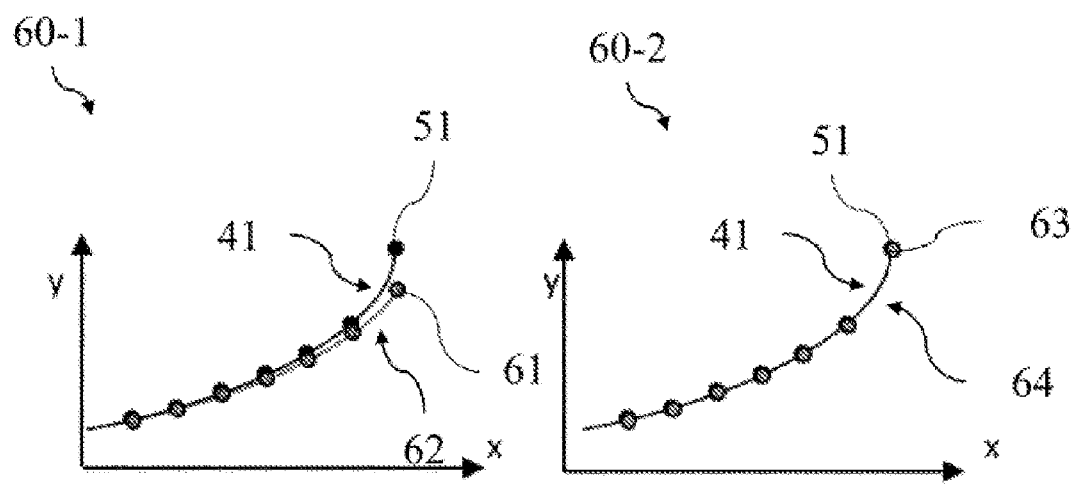
FIG. 6 shows a graphic comparison of two approximation methods for the approximation of the clothoid spline.

This is illustrated in replication 60-2. In the parameter representation for example of the clothoid segment 21, each sample point 63 is represented in a vector representation. A vector of such a sample point 63 comprises for example two components that can be expressed by Fresnel integrals. In order to reduce a numerical complexity of the computation of the Fresnel integrals, a fifth-degree Taylor development of the Fresnel integrals may be used for example instead of the Fresnel integrals. From this approximation of the clothoid segment 21, a function 64 may be obtained for example, the function 64 corresponding to a Taylor polynomial 64 because of the fifth-degree Taylor development. As can be seen in FIG. 6, this polynomial 64 describes the course of the clothoid segment 21 relatively accurately. The sample points 63 determined with the aid of the second measurement model describe the clothoid segment 21 and/or the clothoid spline 20 in good approximation even in the case of great curvatures.

The sample points 63 generated by the second measurement model can represent the clothoid spline 20 in approximation better than the sample points 61 generated by the first measurement model, in particular in the case of great curvatures. Therefore, the course of a roadway can usually be determined with a higher degree of accuracy with the aid of the second measurement model than with the first measurement model. Generally, both measurement models can be applied for estimating the course of a roadway.

Figure 7:
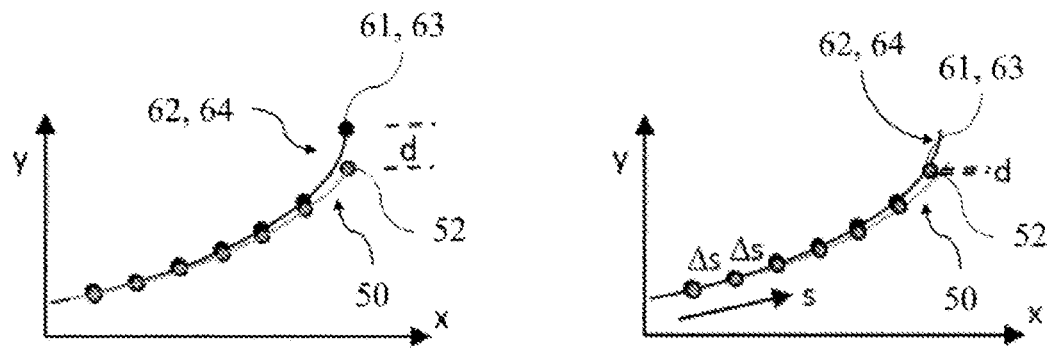
FIG. 7 shows a graphic comparison of two sampling methods.

For a determination of the sample points 61 and 63 of the respective measurement models and the sample points 52 of the surrounding-area measurement data 50, different sampling methods may be used. In FIG. 7, two possibilities for the sampling method are illustrated. In the case of a first, customary sampling method (on the left in FIG. 7), the sample points 61, 63 and 52 may be chosen such that a distance between the sample points in the x direction is constant. It has been found that this sampling method is not optimum for a greatly curved course of a roadway in the adaptation 33 of the clothoid spline 20, or the polynomials 62 and 64, with the Kalman filter. In the case of this sampling method, because of systematic errors based on geometrical conditions in the case of great curvatures of the course of a roadway, the distances between the sample points 61 or 63 and the sample points 52 may be relatively great even though the polynomial 62 or 64 corresponds approximately to the surrounding-area measurement data 50. Then, the Kalman filter would shift the clothoid spline 20 "too much" in the innovation. For example, in the case of an example represented in the diagram on the left of FIG. 7, the clothoid spline 20 is shifted too much in the downward direction, since the distance d of the sample points 61 or 63 from the sample points 52 is relatively great.

Such a systematic error can be reduced by choosing a second sampling method (on the right in FIG. 7) as provided by further exemplary embodiments. In the case of the sampling method illustrated in the diagram on the right of FIG. 7, the sample points 61, 63 and 52 are chosen such that there is a constant arc length $\Delta s$ between neighboring sample points 61, 63 and 52 of the respective polynomials 62, 64 or the surrounding-area measurement data 50. In this way, even in the case of great curvatures of the course of a roadway, the sample points 61, 63 and 52 lie such that, as a result, the distance d between the sample points 61 or 63 and the sample points 52 is for example smaller than in the diagram on the left of FIG. 7. Correspondingly, the clothoid spline 20 for example is shifted to a lesser extent in the downward direction by the Kalman filter. The adaptation 33 of the clothoid spline 20 with the Kalman filter when using the second sampling method can achieve a higher degree of accuracy as compared to the adaptation 33 when using the first sampling method. The second sampling method also has a stabilizing effect on a function of the Kalman filter, and consequently also a stabilizing effect on a lateral guiding behavior when controlling the vehicle, since the clothoid spline 20 is slightly corrected in the adaptation 33 when using the second sampling method. Consequently, it may be that the state function is adapted to a less "great" extent in the individual recursion steps, and consequently can be referred to as "more stable". It will be recognized that in this embodiment, adapting the state function comprises using a sampling method for selecting sample points from measurement models and from surrounding area measurement data such that there is a constant arc length between neighbouring sample points in each case when there are multiple sample points.

Figure 8:
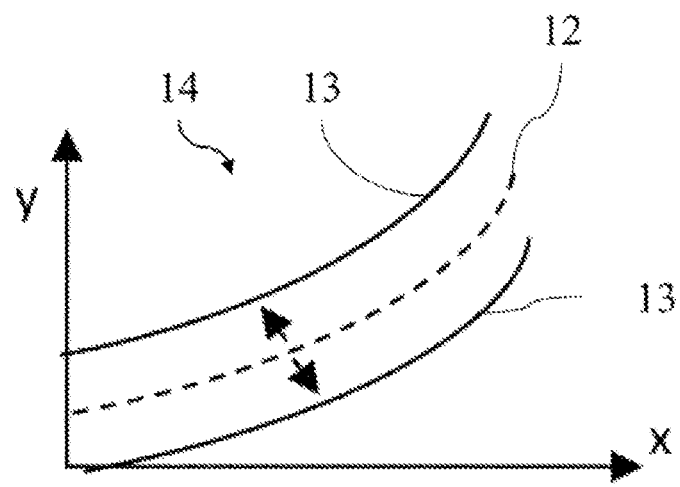
FIG. 8 shows a schematic replication of the roadway marked by roadway markings.

In some exemplary embodiments, the camera 41 may record the course of roadway markings 12 or 13 and the image processing application may be designed to detect such roadway markings 12 or 13 and describe them in approximation by a polynomial or a polynomial spline. The roadway markings 13 in this case identify roadway boundaries of the roadway. The roadway markings 12 identify the centerline of the roadway, which in some cases is not visible. A schematic replication of a roadway identified by roadway markings 12 and 13 is replicated in FIG. 8. On the basis of the course of the roadway markings 12 and/or 13, for example a roadway or lane width may be ascertained from photos of the camera with the aid of a suitable image processing application. In some cases, the estimation of the course of a roadway may correspond to the course of the roadway markings 13. This may be advantageous for the control of the vehicle. For example, it is possible to ascertain the lane width from the courses of two roadway markings 13 that bound the lane to the right and left, or to derive from them the course of the centerline 12.

During the control of the vehicle, it may under some circumstances be necessary to ascertain the course of the lane center. If there is no centerline 12, a course of the lane center cannot be ascertained directly by data fusion 44 of the surrounding-area measurement data 50 of the camera. In such a case, the course of the roadway markings or roadway boundaries 13 may be ascertained by means of data fusion 44, and on that basis the course of the lane center or the centerline 12 can be derived, taking into consideration the lane width. The lane width of the roadway to be determined may either be taken from a dataset available to the vehicle or be determined on the basis of the course of the roadway markings 13. For a determination of the course of the centerline 12, the clothoid spline 20, which for example describes the course of the lane center, may be transformed such that a transformed clothoid spline describes the course of one of the roadway markings 13, in order to make possible an adaptation 33 of the clothoid spline 20 to the surrounding-area measurement data of the camera. After adaptation 33 of the clothoid spline 20, the clothoid spline can be determined by back-transformation and in turn identifies the course of the center of a roadway. For geometrical reasons, it may not be sufficient for the transformation and back-transformation to shift the clothoid spline 20 translationally, that is to say in the x and y directions. For this, it may for example be necessary also to adapt the parameters $c_0$, $c_{1,m}$ by means of a mathematical method such that the transformed clothoid spline corresponds to the course of the centerline 12, and consequently runs parallel to the roadway boundaries 13.

As an alternative, for the adaptation 33 of the clothoid spline 20, the surrounding-area measurement data of the camera may be transformed, while taking into consideration the lane width, in such a way that they identify in approximation the course of the center of a roadway. The Kalman filter can then perform an adaptation 33 of the clothoid spline 20 to the transformed measurement data.

Figure 4:
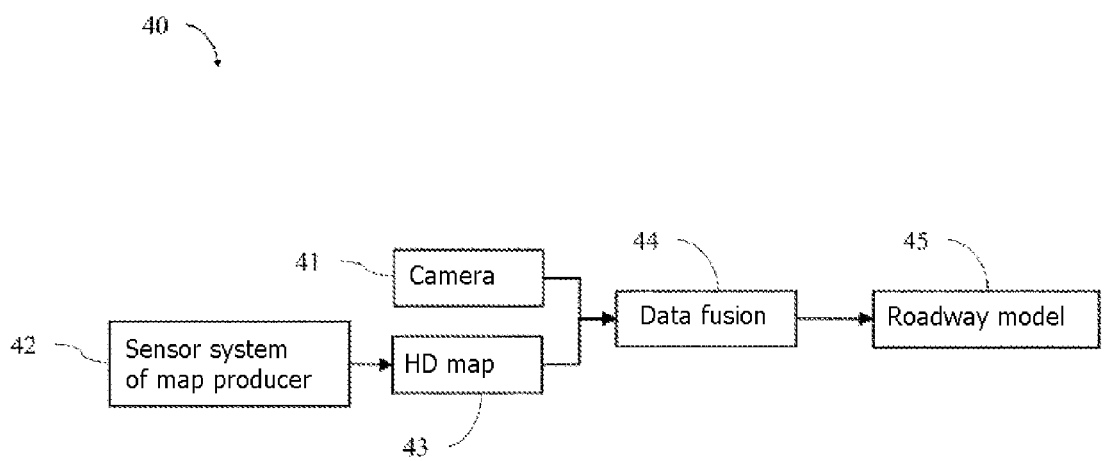
FIG. 4 shows a flow diagram of a multi-sensor data fusion.
Figure 9:
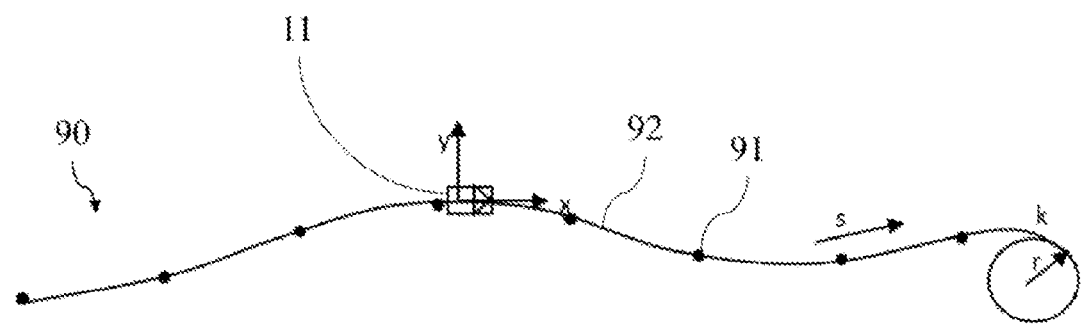
FIG. 9 shows a representation of the map data and the vehicle located on the roadway.

For the multi-sensor data fusion schematically illustrated in FIG. 4, usually surrounding-area measurement data of a further data source, different from the camera, are used. In the exemplary embodiment shown in FIG. 4, the map data of the HD map 43 are used for this. An example of such map data is shown in FIG. 9. The sensor system of the map producer 42 provides waypoints 91, which lie on the roadway of the vehicle 11. The waypoints may be connected by interpolation while taking into consideration further connection conditions. In the interpolation, the waypoints may be connected for example by polynomials 92. Thus, a polynomial spline 90 can be produced from multiple polynomial functions 92. The polynomial spline 90 may for example correspond to the map data.

In some exemplary embodiments of the invention described here, the polynomial spline 90 can be represented as a function in location coordinates. Here, too, the clothoid spline 20, which can be adapted in the data fusion 44 by the Kalman filter to the polynomial spline 90, usually takes the form of a parameter set of the parameters $y_0$, $\theta_0$, $c_0$ and $c_{1,1}, \ldots, c_{1,n}$, which can replicate the clothoid spline 20 with the aid of the curvature values c(s) obtained from (1).

As compared to the surrounding-area measurement data 50 of the camera 41, the map data can already be ascertained long before the camera 41 can record the roadway. Thus, for example, the course of a roadway of the roadway 14 can be estimated on the basis of greatly curved curves and/or curves that cannot be seen. Thus, for example, the map data can be used to obtain a good determination in approximation of the course of a roadway far ahead of the vehicle 11.

Sometimes an orientation of the vehicle cannot be ascertained on the basis of the map data, or not accurately. The orientation of the vehicle 11 with respect to the roadway 14 typically cannot be determined from position data of the vehicle 11 and the polynomial spline 90, since an indication of the orientation of the vehicle 11 cannot be obtained from them.

Usually, therefore, location coordinates of the map data are not used in the Kalman filter in order to adapt the clothoid spline 20 to the map data. A further measurement model, in which the map data are represented in a measurement space which comprises a coordinate system with curvature values, may be applied here.

For the aforementioned data fusion 44 in the measurement space with the coordinate system with curvature values, it is for example advantageous to represent the clothoid spline 20 according to (1). Consequently, the state space of the clothoid spline 20 may already correspond to the measurement space.

The polynomial spline 90 provided by the HD map 43 usually takes the form of a replication in a coordinate system with location coordinates. In advantageous embodiments of the invention disclosed here, a transformation 32 of the map data into the measurement space with the coordinate system with curvature values may therefore be necessary. A suitable replication of the map data may be for example a function of the arc length s of the map data, a curvature value k of the map data being obtained dependent on the arc length s.

For the adaptation 33 of the clothoid spline 20 to the polynomial spline 90, the curvature values of the clothoid spline 20 are approximated to the curvature values k of the polynomial spline 90 for example in the innovation of the Kalman filter. For example, for this the curvature values k at the waypoints of the map data are considered. The adaptation 33 may take place by adapting the parameters $y_0$, $\theta_0$, $c_0$ and $c_{1,1}, \ldots, c_{1,n}$.

An advantage of the described data fusion 44 on the basis of the curvature values k is that this data fusion 44 is robust with respect to angle and offset errors. On the assumption that a localization ascertains a lane in which the vehicle 11 is actually located, the course of a roadway can be accurately estimated for example on the basis of the curvature values k, even if the vehicle 11 is not exactly in the center of the lane or is not aligned parallel to the centerline 12.

In advantageous embodiments of the invention disclosed here, the computer-implemented method may comprise the multi-sensor data fusion 40. Advantages can be obtained in this case from the multi-sensor data fusion 40 of surrounding-area measurement data 50 and map data.

In the data fusion 44 of the surrounding-area measurement data, for example the position and orientation of the vehicle 11 with respect to the roadway 14 may be ascertained. In the control of the vehicle 11, for example the vehicle 11 can consequently be prevented from leaving the roadway 14.

With the aid of the data fusion 44 of the map data, the course of a roadway can be determined far ahead, so that the control of the vehicle 11 can for example reduce a speed of the vehicle early enough to drive safely through a greatly curved curve that cannot be seen. Furthermore, the data fusion 44 offers robustness with respect to angle and offset errors in the estimation of the course of a roadway, whereby measuring errors of the estimation can be reduced.

Figure 10:
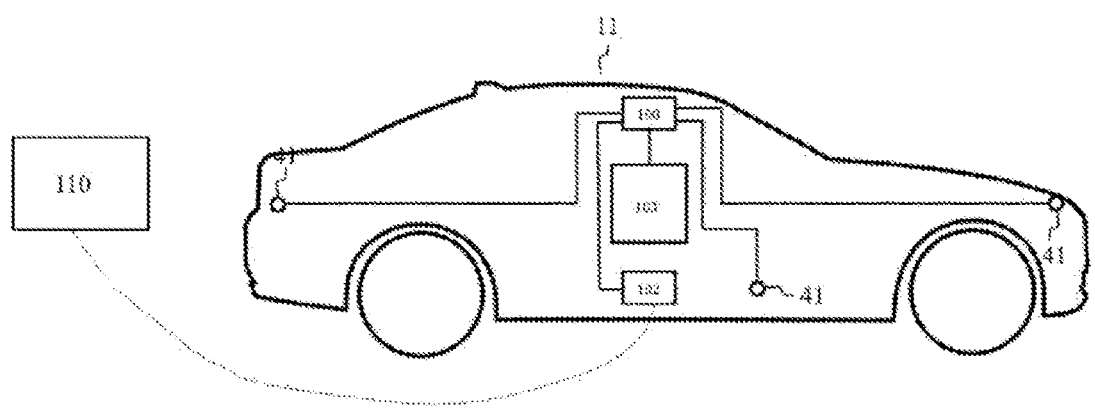
FIG. 10 shows a schematic replication of the vehicle with a device for estimating the course of a roadway.

The computer-implemented method 30 may be used for the control of any land vehicles 11. An example of such a vehicle 11 is shown in FIG. 10. The vehicle 11 may in this case be equipped with a device 100 that serves for estimating the course of a roadway. The device 100 in this case comprises a processing unit (not shown here) and multiple interfaces for recording surrounding-area measurement data. Such an interface may be for example a connection of the processing unit to one or more cameras 41. The cameras 41 may be aligned for example in the direction of travel, against a direction of travel or to the side and make possible provision 31 of the surrounding-area measurement data 50. Further interfaces may connect the processing unit to a storage medium 103, such as for example a hard disk drive or an optical memory, and in addition or as an alternative to a receiving unit 102. The provision 31 of map data 90 may be made possible by the map data 90 being able to be available on the storage medium 103 or received by the receiving unit 102 and provided to the processing unit. For example, the map data may be transmitted from a transmitter 110 to the receiving unit. With the surrounding-area measurement data 50 and the map data, the device 100 can determine an estimation of the course of a roadway by performing the computer-implemented method 10.

For this, the processing unit is designed to perform the transformation 32 of the clothoid spline 20 and the surrounding-area measurement data 50 and/or the map data. Furthermore, the processing unit is configured for the adaptation 33 of the clothoid spline 20 to the surrounding-area measurement data. The processing unit may be for example a processor, a microcontroller, a field-programmable gate array (FPGA), a computer or a programmable hardware component.

The aspects and features that have been described together with one or more of the examples and figures detailed above can also be combined with one or more of the other examples in order to replace an identical feature of the other example or in order to introduce the feature additionally into the other example.

Examples may also be or relate to a computer program with a program code for performing one or more of the above methods when the computer program is executed on a computer or processor. Steps, operations or processes of various methods described above may be performed by programmed computers or processors. Examples may also cover program storage devices, for example digital data storage media, which are machine-, processor- or computer-readable and code machine-executable, processor-executable or computer-executable programs of instructions. The instructions perform some or all of the steps of the methods described above or instigate performing them. The program storage devices may comprise or be for example digital stores, magnetic storage media, such as for example magnetic disks and magnetic tapes, hard disk drives or optically readable digital data storage media. Further examples may also cover computers, processors or control units programmed for performing the steps of the methods described above or (field-) programmable logic arrays ((F)PLA) or (field-) programmable gate arrays ((F)PGA) programmed for performing the steps of the methods described above.

The description and drawings only represent the principles of the disclosure. Furthermore, all of the examples presented here are in principle expressly intended only to serve for illustrative purposes, in order to assist the reader in understanding the principles of the disclosure and the concepts contributed by the inventor(s) for the further development of the technology. All statements made here concerning principles, aspects and examples of the disclosure as well as specific examples of the same comprise equivalents thereof.

A function block denoted as "means for . . . " performing a specific function can relate to a circuit designed for performing a specific function. Consequently, a "means for something" can be implemented as a "means designed for or suitable for something", for example a component or a circuit designed for or suitable for the respective task.

Functions of various elements shown in the figures, including of any function blocks referred to as "means", "means for providing a signal", "means for generating a signal", etc., can be implemented in the form of dedicated hardware, for example of "a signal provider", "a signal processing unit", "a processor", "a controller", etc., and as hardware capable of executing software in conjunction with associated software. When provided by a processor, the functions can be provided by a single dedicated processor, by a single shared processor or by a plurality of individual processors, some or all of which may be shared. However, the term "processor" or "controller" is far from limited to hardware exclusively capable of executing software, but rather can encompass digital signal processor hardware (DSP hardware; DSP=digital signal processor), network processor, application specific integrated circuit (ASIC), field programmable gate array (FPGA), read only memory (ROM) for storing software, random access memory (RAM) and nonvolatile storage device. Other hardware, conventional and/or customized, may also be included.

A block diagram may for example depict a rough circuit diagram that implements the principles of the disclosure. In a similar manner, a flowchart, a flow diagram, a state transition diagram, a pseudocode and the like may represent various processes, operations or steps that are represented, for example, substantially in a computer-readable medium and are thus performed by a computer or processor, regardless of whether such a computer or processor is explicitly shown. Methods disclosed in the description or in the patent claims may be implemented by a component having a means for performing each of the respective steps of these methods.

It goes without saying that the disclosure of multiple steps, processes, operations or functions disclosed in the description or the claims should not be interpreted as being in a specific order, unless explicitly or implicitly indicated otherwise, for example for technical reasons. The disclosure of multiple steps or functions therefore does not limit them to a specific order, unless these steps or functions are not interchangeable for technical reasons. Furthermore, in some examples, an individual step, function, process or operation may include multiple sub-steps, sub-functions, sub-processes or sub-operations and/or may be subdivided into them. Such sub-steps may be included and be part of the disclosure of this individual step, provided they are not explicitly excluded.

Furthermore, the claims that follow are hereby incorporated into the detailed description, where each claim may stand alone as a separate example. While each claim may stand alone as a separate example, it should be borne in mind that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

LIST OF REFERENCE SIGNS 11 vehicle
12 centerline
13 roadway boundary
14 roadway
20 clothoid spline
21 clothoid segment
22 transition point
30 computer-implemented method
31 provision of the surrounding-area measurement data 32 transformation of the state function and the surrounding-area measurement data
33 adaptation of the state function
40 multi-sensor data fusion
41 camera
42 sensor system of the map producer
43 HD map
44 data fusion
45 roadway model
50 surrounding-area measurement data of the camera
51 sample points of the clothoid spline
52 sample points of the surrounding-area measurement data of the camera
60-1 replication of the first sampling method
60-2 replication of the second sampling method
61 sample points of the polynomial
62 polynomial
63 sample point of the Taylor polynomial
64 Taylor polynomial
90 polynomial spline
91 waypoint
92 polynomial function
100 device
102 receiving unit
103 storage medium
110 transmitter

The invention claimed is:

1. A computer-implemented method for estimating a course of a roadway in a surrounding area of a vehicle on the basis of a state function describing the course of a roadway, the state function comprising a clothoid spline, the method comprising:
providing surrounding-area measurement data describing the course of the roadway at a current position of the vehicle, the surrounding-area measurement data comprising at least one polynomial function;
transforming the state function into a different coordinate system such that the state function is transformed from a state space to a measurement space, wherein the state function and the surrounding-area measurement data are both in a common coordinate system as a result of said transforming; and
after said transforming, adapting the state function on the basis of the surrounding-area measurement data in the common coordinate system, wherein adapting the state function further comprises using a sampling method for selecting sample points from measurement models and from surrounding area measurement data such that there is a constant arc length between neighbouring sample points in each case when there are multiple sample points.

2. The computer-implemented method as claimed in claim 1, wherein the surrounding-area measurement data is recorded by at least one camera.

3. The computer-implemented method as claimed in claim 1, wherein the surrounding-area measurement data is provided by a map.

4. The computer-implemented method as claimed in claim 1, wherein the surrounding-area measurement data comprises first surrounding-area measurement data recorded by at least one camera and second surrounding-area measurement data provided by a map.

5. The computer-implemented method as claimed in claim 1, wherein the common coordinate system comprises location coordinates.

6. The computer-implemented method as claimed in claim 1, wherein the common coordinate system comprises curvature values.

7. The computer-implemented method as claimed in claim 1, wherein adapting the state function to the surrounding-area measurement data provides an adaptation of at least one curvature value of the state function to at least one further curvature value of the surrounding-area measurement data.

8. The computer-implemented method as claimed in claim 1, wherein the state function identifies a course of a roadway marking of a roadway.

9. The computer-implemented method as claimed in claim 8, further comprising ascertaining a course of a lane center by transforming the state function.

10. The computer-implemented method as claimed in claim 1, further comprising providing validation measurement data and a validation of the estimation of the course of the roadway with the aid of the validation measurement data.

11. A device for estimating the course of a roadway in the surrounding area of the vehicle, comprising:
one or more interfaces configured to record surrounding-area measurement data;
a processing unit configured to perform the computer-implemented method as claimed in claim 1.

12. A vehicle comprising the device as claimed in claim 11.

13. The method of claim 1 wherein the state function is represented in the state space by arc lengths and curvature values, wherein a measurement model is used to transform the clothoid spline from the from the state space to the measurement space, and wherein the measurement space serves as the common coordinate system comprising two-dimensional location coordinates.

14. The method of claim 13 wherein the measurement model provides an approximate representation of the clothoid spline in the form of a polynomial, wherein sample points generated by the polynomial approximate the clothoid spline.

15. The method of claim 14 wherein the polynomial is a third degree polynomial.

16. The method of claim 13 wherein the measurement model provides a parameter representation of the clothoid spline, wherein sample points generated by the parameter representation approximate the clothoid spline.

17. The method of claim 16 wherein each of the sample points of the parameter representation is represented in a vector representation.

18. The method of claim 13 wherein a sampling method is used to generate sample points based on the measurement model, wherein the sampling method includes (i) determining sample points such that a distance between the sample points in an x-direction is constant, or (ii) determining sample points such that there is a constant arc length change between neighbouring sample points.

19. The method of claim 2 wherein images of roadway markings or roadway boundaries captured by said at least one camera are processed in order to approximate the course of the roadway by at least one polynomial function.

* * * * *